(12) United States Patent
Sheu et al.

(10) Patent No.: US 8,401,057 B2
(45) Date of Patent: Mar. 19, 2013

(54) OFDM-BASED RELAY-ASSISTED CHANNEL ESTIMATION METHOD

(75) Inventors: Jeng-Shin Sheu, Yunlin County (TW); Jenn-Kaie Lain, Yunlin County (TW)

(73) Assignee: National Yunlin University of Science and Technology, Douliu, Yunlin County (TW)

( * ) Notice: Subject to any disclaimer, the term of this patent is extended or adjusted under 35 U.S.C. 154(b) by 151 days.

(21) Appl. No.: 13/113,415

(22) Filed: May 23, 2011

(65) Prior Publication Data

US 2012/0300816 A1 Nov. 29, 2012

(51) Int. Cl.
H04B 17/02 (2006.01)
H04B 7/14 (2006.01)
(52) U.S. Cl. ........................................ 375/211; 370/315
(58) Field of Classification Search .................. 375/211, 375/130, 219, 315; 370/252, 279, 315, 328
See application file for complete search history.

(56) References Cited

U.S. PATENT DOCUMENTS

2012/0263210 A1* 10/2012 Panah et al. .................... 375/211
2012/0294226 A1* 11/2012 Racz et al. ..................... 370/315

OTHER PUBLICATIONS

Patel, et al., "Channel Estimation for Amplify and Forward Relay Based Cooperation Diversity Systems", IEEE Transactions on Wireless Communications, vol. 6, No. 6, Jun. 2007, pp. 2348-2356.
Chen, et al., "Channel Estimation for Amplify and Forward Relay in OFDM System", International Conference on Wireless Communications, Networking and Mobile Computing, Oct. 2008, pp. 1-4.

* cited by examiner

*Primary Examiner* — Khai Tran
(74) *Attorney, Agent, or Firm* — Muncy, Geissler, Olds & Lowe, PLLC

(57) ABSTRACT

An OFDM-based relay-assisted channel estimation method enables a composite channel (source-relay-destination) to be disintegrated into a source-to-relay channel and a relay-to-destination channel and separately estimated at the destination node in a relay-assisted way. A relay-amble signal is added to a sub-frame when the relay node is forwarding the amplified signals from the source node. Through the relay-amble signal, the second channel estimation from the relay node to the destination node is performed to obtain a second channel coefficient, and then uses an ML (Maximum Likelihood Estimator) algorithm to estimate a first channel coefficient from the source node to the relay node. After having estimated the coefficients of the two channels, the optimum diversity combining is performed at the destination node to improve accuracy of received data.

5 Claims, 8 Drawing Sheets

OFDM-BASED RELAY-ASSISTED CHANNEL ESTIMATION METHOD

FIELD OF THE INVENTION

The present invention relates to a channel estimation method, particularly to an OFDM-based relay-assisted channel estimation method for an AF relaying system in a wireless communication system.

BACKGROUND OF THE INVENTION

The mobile communication technology constantly pursues improvements in quality and quantity to satisfy up-to-date requirements. In the next-generation mobile communication system, a relaying system is used to expand the system coverage, increase the overall throughput, promote the transmission efficiency, and reduce the path loss between a base station and a mobile station, whereby is effectively saved the transmission power of the mobile station and greatly prolonged the run time of batteries of the mobile station. If the relaying systems are appropriately disposed on the boundaries of the base station coverage or the areas having a serious shadowing effect, the base station can provide uniform data rate coverage for users at different locations within the coverage.

A relaying system may work in a DF (Decode-and-Forward) mode or an AF (Amplify-and-Forward) mode. Compared with the DF relaying system, the AF relaying system is free of active elements for decoding. Therefore, the AF relaying system has the advantages of low cost, easy installation and small size.

The OFDM (Orthogonal Frequency Division Multiplexing) technology is an efficient modulation scheme to increase the bandwidth efficiency and prevent the inter-symbol interference between signals. The OFDM technology has been widely applied to various wired and wireless communication systems, such as ADSL, 3GPP-LTE (Long Term Evolution) and WiMAX (Worldwide Interoperability for Microwave Access).

Refer to FIGS. 1A and 1B for a two-phase and half-duplexing OFDM AF relaying system. In the first phase, the source node transmits signals, and the relay node receives signals. In the second phase, the signals are amplified by the relay node and are transmitted to the destination node. Two cooperative protocols are involved in the system: the RD (Received Diversity) protocol and the MH (Multi-Hop) protocol. Under the RD protocol, the destination node receives the signals respectively from the source node and the relay node in the first phase and the second phase. Under the MH protocol, the destination node only receives the signals from the relay node in the second phase.

Under the above-mentioned RD protocol, the relaying system is used to promote diversity. Owing to the transmission characteristic of wireless channels, the destination node receives signals from the source node through a direct path (source-to-destination) and signals from the relay node through a relay path (source-to-relay-to-destination). The signals (carrying the same data) from different paths are performed diversity combining at the destination node to obtain diversity, whereby to reduce the shadowing effect and multi-path fading and improve the signal quality at the destination node.

Currently, the channel estimation methods for the OFDM-based AF relaying system have the following related technologies. C.S. Patel and G.L. Stuber disclosed an LMMSE (Linear Minimum Mean Square Error) channel estimation method in a paper "Channel Estimation for Amplify and Forward Relay Based Cooperation Diversity Systems", IEEE Trans. Wireless Commun., Vol 6, pp. 2348-2356, 2007. Fand Liu, Zhe Chen, Xin Zhang and Dacheng Yang disclosed a low rank MMSE channel estimation method in a paper "Channel Estimation for Amplify and Forward Relay in OFDM System", International Conference on Wireless Communications, Networking and Mobile Computing, October 2008, pp. 1-4, which is based on an SVD (Singular Value Decomposition) method and exempted from inverse operation of the channel correlation matrix.

The above-mentioned prior arts focus on the estimation of the composite channel (source-to-relay-to-destination) coefficient rather than the estimation of the respective channel coefficients of source-to-relay and relay-to-destination in the relay path. However, in order to obtain diversity at the destination node, the estimation of two channels of the source-to-relay and the relay-to-destination are required in diversity combining. The difficulty of estimating individual channel is that the signal amplified by the relaying system and transmitted to the destination node no more makes the channel and noise observed at the destination node to be presented in a Gaussian distribution. This thus leads all the current AF relaying systems in the prior arts to estimate channels in a suboptimal way. Further, in the conventional literatures, the channel estimation methods are based on MIP (Multipath Intensity Profile), which is obtained by additionally consuming system resources. The present invention is exempted from using MIP.

SUMMARY OF THE INVENTION

The primary objective of the present invention is to solve the problem that the conventional technology cannot respectively estimate channels of source-to-relay and relay-to-destination. Another objective of the present invention is to improve data accuracy by performing cooperative diversity to the received signals from the direct path and the relay path at the destination node after the channel coefficients have been respectively estimated.

To achieve the above-mentioned objectives, the present invention proposes an OFDM-based relay-assisted channel estimation method, which applies to an AF relaying system, wherein a composite channel of the relay path (source-to-relay-to-destination) can be disintegrated into a source-to-relay channel and a relay-to-destination channel through a relay-amble signal and then the channels are separately estimated at the destination node. In the second phase, the signal amplified and forwarded by the relay node is placed in a sub-frame and the relay-amble signal is placed in a portion of the sub-frame (e.g. the relay-amble signal is placed at the end of the sub-frame in IEEE 802.16j specification). The destination node receives the sub-frame containing the amplified and forwarded signal from the relay node and the relay-amble signal, which are respectively transmitted via the composite channel (source-to-relay-to-destination) and the point-to-point channel (relay-to-destination). All the conventional technologies (including the optimum method) can be used to estimate the channel in which the relay-amble signal is transmitted because the channel is a point-to-point channel. Therefore, after the destination node has received the sub-frame, the estimation of the relay-to-destination channel coefficient is performed through the relay-amble signal in the sub-frame. Then using the estimated relay-to-destination channel coefficient, the other source-to-relay channel coefficient can be estimated at the destination node through the signal receptions, which are propagated via the composite channel.

In the present invention, an MLE (Maximum Likelihood Estimator) algorithm is used to estimate the source-to-relay channel coefficient of the relay path. After two channel coefficients have been obtained, the optimum diversity combining is performed through the signals received from the direct path and the relay path at the destination node to achieve diversity and increase data accuracy.

The technical contents and embodiments of the present invention will be described in detail in cooperation with the drawings below.

DETAILED DESCRIPTION OF THE PREFERRED EMBODIMENTS

Below, the technical contents of the present invention are described in detail in cooperation with the drawings.

Figure 1A:
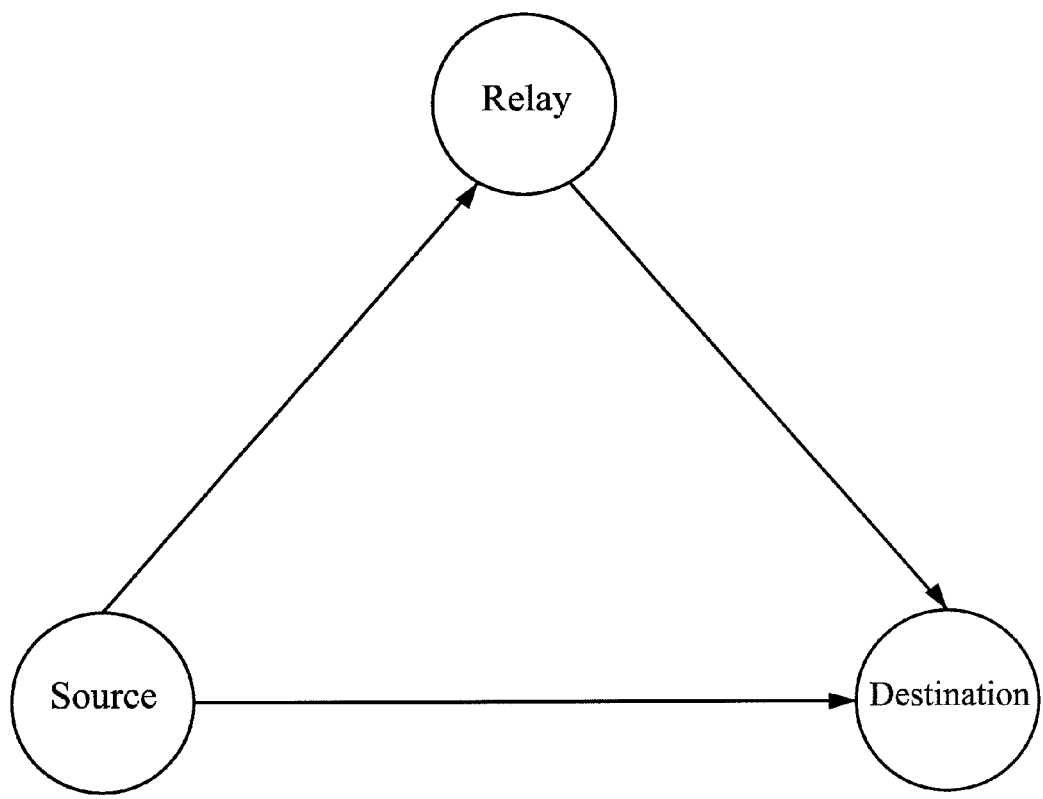
FIG. 1A is a diagram schematically showing the transmission and reception of signals in the conventional technology.
Figure 1B:
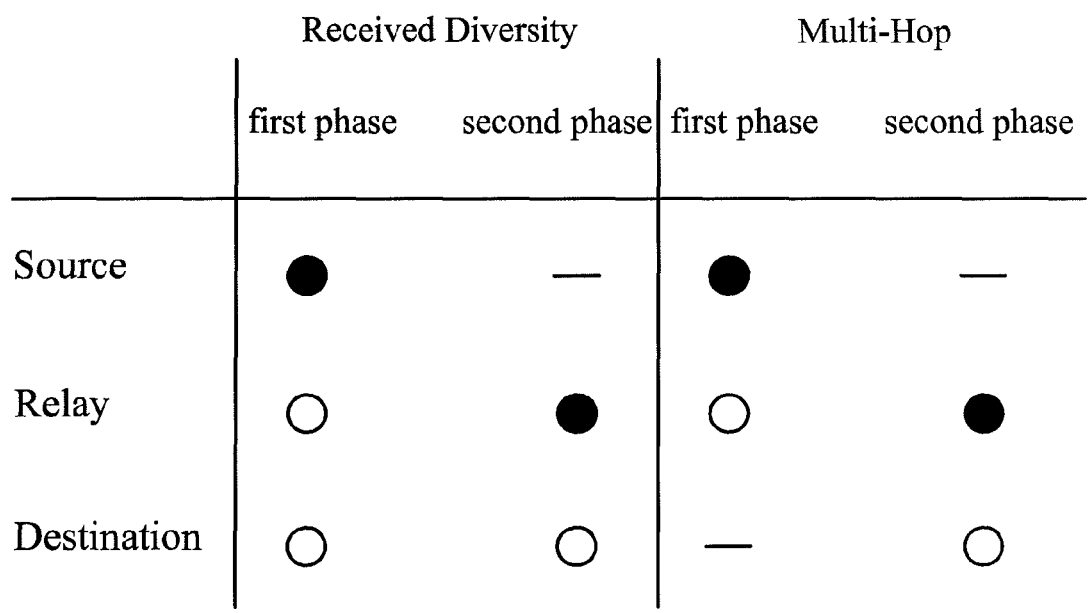
FIG. 1B is a diagram schematically showing a conventional two-phase and half-duplexing AF relaying system operated under an RD protocol or an MH protocol.
Figure 2:
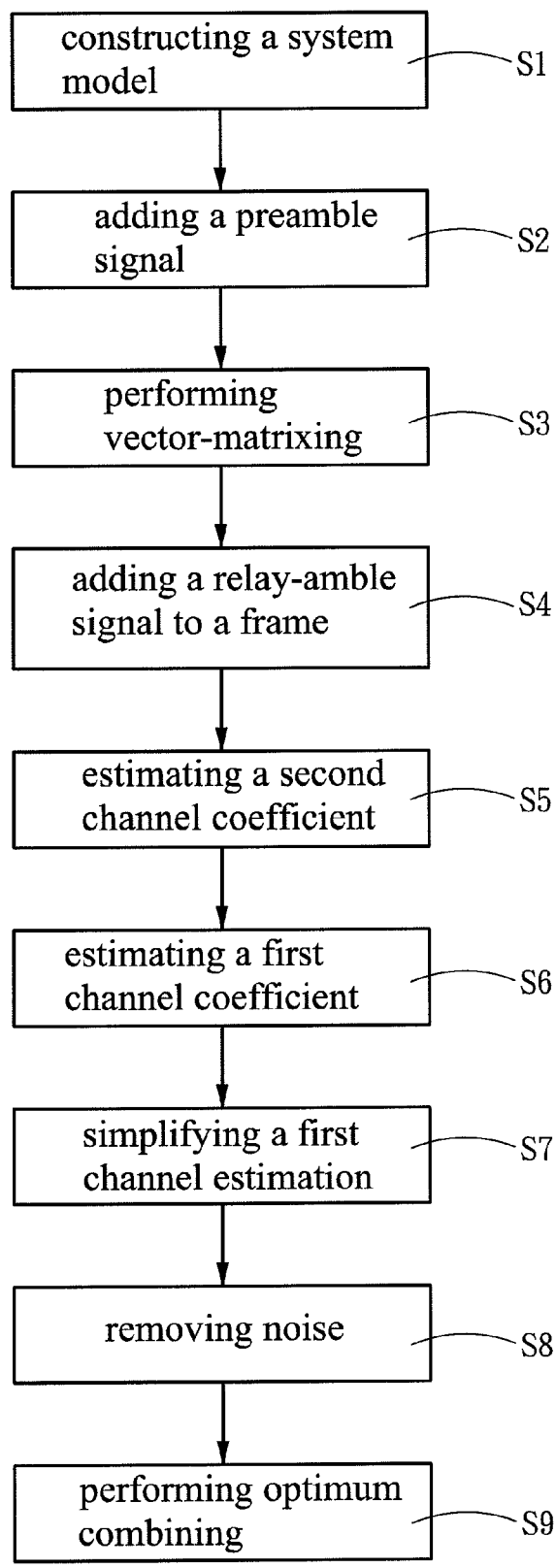
FIG. 2 is a flowchart of an OFDM-based relay-assisted channel estimation method according to one embodiment of the present invention.
Figure 3:
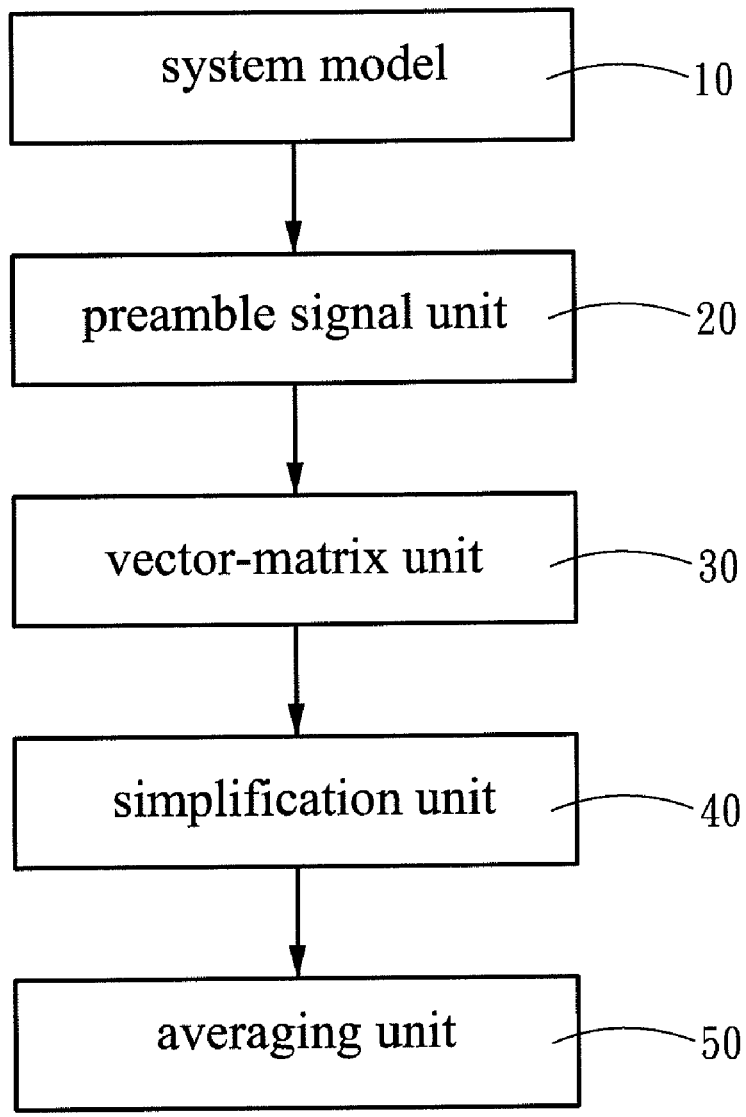
FIG. 3 is a block diagram schematically showing the architecture of an OFDM-based relay-assisted channel estimation system according to one embodiment of the present invention.
Figure 4:
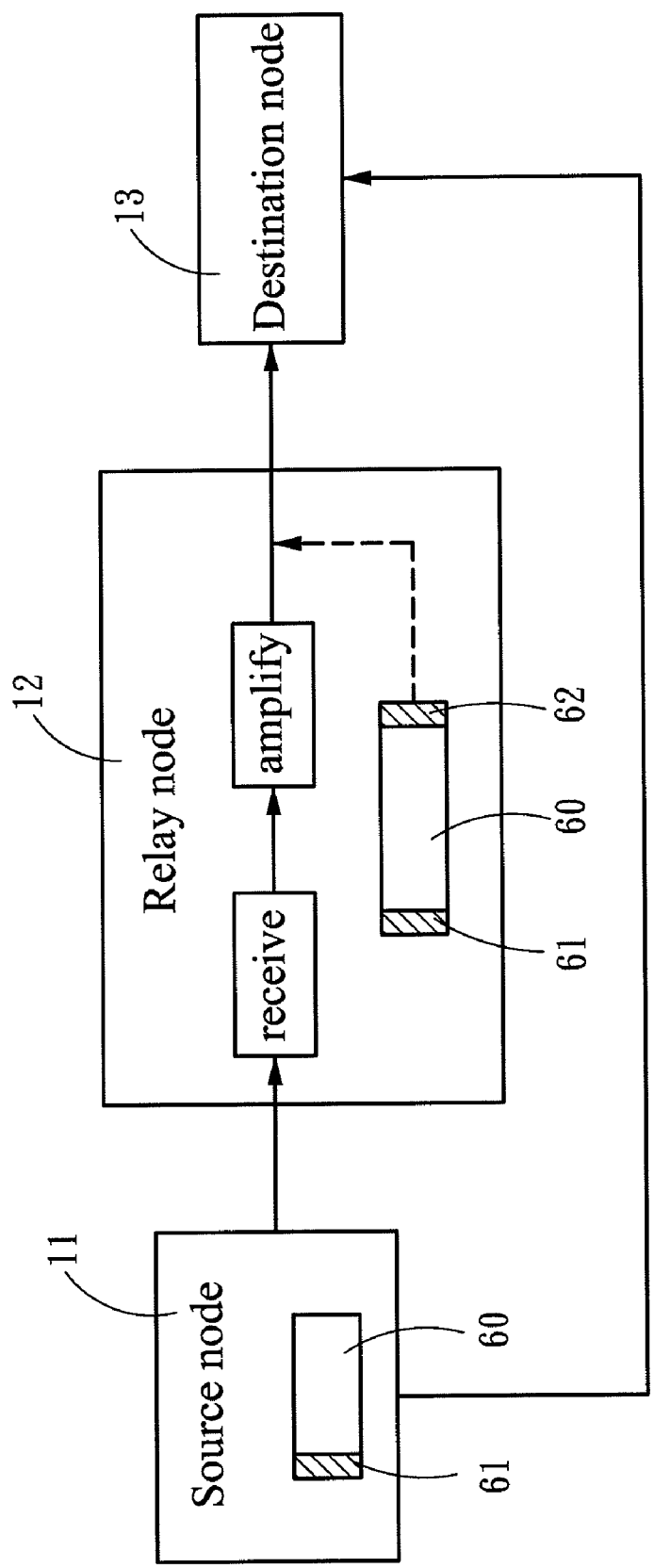
FIG. 4 is a diagram schematically showing channels of an OFDM-based relay-assisted channel estimation system according to one embodiment of the present invention.

Refer to FIGS. 2-4. FIG. 2 is a flowchart of an OFDM-based relay-assisted channel estimation method according to one embodiment of the present invention. FIG. 3 is a block diagram schematically showing the architecture of an OFDM-based relay-assisted channel estimation system according to one embodiment of the present invention. FIG. 4 is a diagram schematically showing the channels of an OFDM-based relay-assisted channel estimation system according to one embodiment of the present invention. The present invention proposes an OFDM-based relay-assisted channel estimation method, which applies to an AF relaying system and separately estimates a channel from a source node 11 to a relay node 12 and a channel from the relay node 12 to the destination node 13 at the destination node 13 in a relay-assisted way in a wireless communication system. The method of the present invention comprises the following steps of:

Step S1—constructing a system model 10: construct a first channel and a second channel, wherein the first channel represents the channel from the source node 11 to the relay node 12 and the second channel represents the channel from the relay node 12 to the destination node 13, and wherein the destination node receives a signal including a kth sub-carrier wave through the first and second channels, and the signal is given by $$Y_k^d = (1/\sqrt{N}) \sum_{n=0}^{N-1} y_n^d e^{-j2\pi kn/N}$$

$$= H_k^d H_k^r \alpha d_k + H_k^d \alpha W_k^r + W_k^d, \ 0 \le k \le N-1,$$

wherein k is the index of a sub-carrier wave, $\{y_n^d\}$ is the received signal in the time domain, $d_k$ is the data transmitted from the source node 11 in the kth sub-carrier wave, $H_k^r$ is the CFR (Channel Frequency Response) of the first channel, $H_k^d$ is the CFR of the second channel, $\alpha$ is the amplifying gain of the relaying system, $W_k^r$ and $W_k^d$ are respectively the noises observed at the relay node 12 and the destination node 13. From the above-mentioned equation, it is known that the channel coefficient of the data $d_k$ is derived from the product of $H_k^r$ and $H_k^d$, and $H_k^d \alpha W_k^r + W_k^d$ is the equivalent noise. Therefore, neither the composite channel nor the equivalent noise presents the Gaussian distribution any more. Thus, it is very difficult to separately obtain the channel frequency response of the channels.

Step S2—adding a preamble signal 61 to a frame 60: refer to FIG. 4, use a preamble signal unit 20 to add a preamble signal 61 to a frame 60 carrying the signal output from the source node 11, wherein the preamble signal 61 includes training symbol used to perform the synchronous coefficient estimation for the received signal and preliminary estimation of channel coefficient at the destination node 13.

Step S3—performing vector-matrixing: use a vector-matrix unit 30 to perform vector-matrixing on the signal containing the preamble signal 61 and obtain an equation expressed by:

$$Y_k = [Y_k^d(1), Y_k^d(2), \ldots, Y_k^d(L)]^T$$

$$= S_k + N_k, \ 0 \le k \le N-1,$$

wherein the superscript T denotes a transpose operation, L denotes the number of the training symbols of the preamble signal 61. After all the signals have been classified, two L-by-1 column vectors $S_k$ and $N_k$ are obtained, wherein $S_k$ is the generic term of the signals and $N_k$ is the generic term of the noises. The lth element of $S_k$ is $S_k$ (l), which is defined to be $H_k^d(l) H_k^r(l) \alpha d_k(l)$; the lth element of $N_k$ is $N_k$ (l), which is defined to be $H_k^d(l) \alpha W_k^r(l) + W_k^d(l)$.

Step S4—adding a relay-amble signal 62 to the frame 60: add a relay-amble signal 62 to the frame 60 amplified by the relay node 12 and then transmit the frame 60 containing the relay-amble signal 62 through the second channel to the destination node 13.

Step S5—estimating the second channel coefficient: after the destination node 13 has received the frame 60 containing the relay-amble signal 62, the channel estimation is performed to obtain the second channel coefficient through the relay-amble signal 62. As the relay-amble signal 62 is added to the frame 60 by the relay node 12 in the second phase, the channel that the relay-amble signal 62 passes through is a point-to-point channel (relay-to-destination). Therefore, the second channel coefficient $H_k^d$ can be obtained through the relay-amble signal 62 at the destination node 13.

Step S6—estimating the first channel coefficient: use an ML (Maximum Likelihood) method to perform channel estimation. Using the estimated second channel coefficient $H_k^d$ obtained in the Step S5, the destination node 13 estimates the first channel coefficient from the signal receptions $Y_k$, which are propagated through the composite channel. The first channel coefficient of the source node 11 to the relay node 12 is expressed by the following equation:

$$\hat{H}_k^r = \arg\left\{\max_{H_k^r} p(Y_k \mid d_k, H_k^r, H_k^d, \alpha)\right\}$$
$$= \arg\left\{\min_{H_k^r}[(Y_k - S_k)^H (Y_k - S_k)]\right\}, \ 0 \leq k \leq N-1,$$

wherein the superscript H denotes a conjugate transpose operation (Hermitian), and p(·) is a probability density function. $H_k^r$ and $H_k^d$ are respectively L-by-1 column vectors denoting the first channel and the second channel coefficients, and the lth elements thereof are respectively $H_k^r(l)$ and $H_k^d(l)$. $d_k$ is an L-by-1 column vector, and the lth element thereof is $d_k(l)$.

Step S7—simplifying the estimation of the first channel: after the ML method, a simplification unit 40 is used to simplify the equation for estimating the first channel coefficient to obtain a simplified equivalent channel estimation equation expressed by:

$$\hat{H}_k^r = \arg\left\{\min_{H_k^r}\left[H_k^{rH}\mathrm{diag}\{\tilde{d}_k\}H_k^r - \tilde{Y}_k^H H_k^r - \left(\tilde{Y}_k^H H_k^r\right)^H\right]\right\}, \ 0 \leq k \leq N-1,$$

wherein $\tilde{Y}_k$ and $\tilde{d}_k$ are L-by-1 column vectors, and the lth elements thereof are respectively defined to be $Y_k^d(l)H_k^{d*}(l)\alpha d_k^*(l)$ and $H_k^d(l)\alpha d_k(l)$. diag{b} is a diagonal matrix with the diagonal elements as vector b. The superscript * denotes a conjugate operation. Next, perform the global optimization to further simplify the above-mentioned equivalent channel estimation equation. In such a case, only an extreme value is obtained by differentiating the equivalent channel estimation equation with respect to $\hat{H}_k^r$. Therefore, the zero value is the result of the global optimum simplification process, and is obtained by a following equation:

$$\hat{H}_k^r = \mathrm{diag}^{-1}\{\tilde{d}_k\}\tilde{Y}_k, \ 0 \leq k \leq N-1$$
$$= [Y_k^d(1)/H_k^d(1)\alpha d_k(1), \ldots, Y_k^d(L)/H_k^d(L)\alpha d_k(L)]^T.$$

Step S8—removing noise: noise is a random variable with an expected value of zero. Thus, the simplified first channel estimation obtained in Step S7 is performed summation and average through an averaging unit 50 to diminish the noise influence on the first channel estimation. The averaging unit 50 performs the averaging according to the following equation:

$$\hat{H}_{k,[L]}^r = \frac{1}{L}\sum_{l=1}^{L}\frac{Y_k^d(l)}{H_k^d(l)\alpha d_k(l)}$$
$$= \frac{L-1}{L}\hat{H}_{k,[L-1]}^r + \frac{1}{L}\frac{Y_k^d(L)}{H_k^d(L)\alpha d_k(L)},$$

wherein [L] expresses that L pieces of successive signals are used to estimate the first channel estimation $\hat{H}_{k,[L]}^r$ which can be updated according to the second equality expressing the iterative calculation. The iterative calculation shows that the data detected at the destination node 13 can be used to update the result of the first channel estimation.

Step S9—performing optimum combining: in one embodiment, MRC (Maximum Ratio Combining) is used to perform combining under the RD (Received Diversity) protocol to obtain the optimum transmission signal, wherein the signals respectively received from the direct path (the source node 11 to the destination node 13) and the relay path (the source node 11 to the relay node 12 to the destination node 13) under the RD protocol are combined according to the first and second channel coefficients. The MRC coefficients include $$\beta_k^I = (\hat{H}_k)^*/\sigma_I^2 \text{ and}$$

$$\beta_k^{II} = \alpha(\hat{H}_k^r \hat{H}_k^d)^*/(\sigma_{II}^2 + \sigma_{II}^2 \alpha^2 |\hat{H}_k^d|^2)$$

wherein $\hat{H}_k$ denotes the channel coefficient of the kth subcarrier wave in the direct path, and wherein $\hat{H}_k^r$ and $\hat{H}_k^d$ respectively denote the estimated values of the first and second channel coefficients of the kth sub-carrier wave in the relay path, and wherein $\sigma_I^2$ and $\sigma_{II}^2$ respectively denote the variances of the noises observed at the destination node 13 in the first phase and the second phase.

Figure 5:
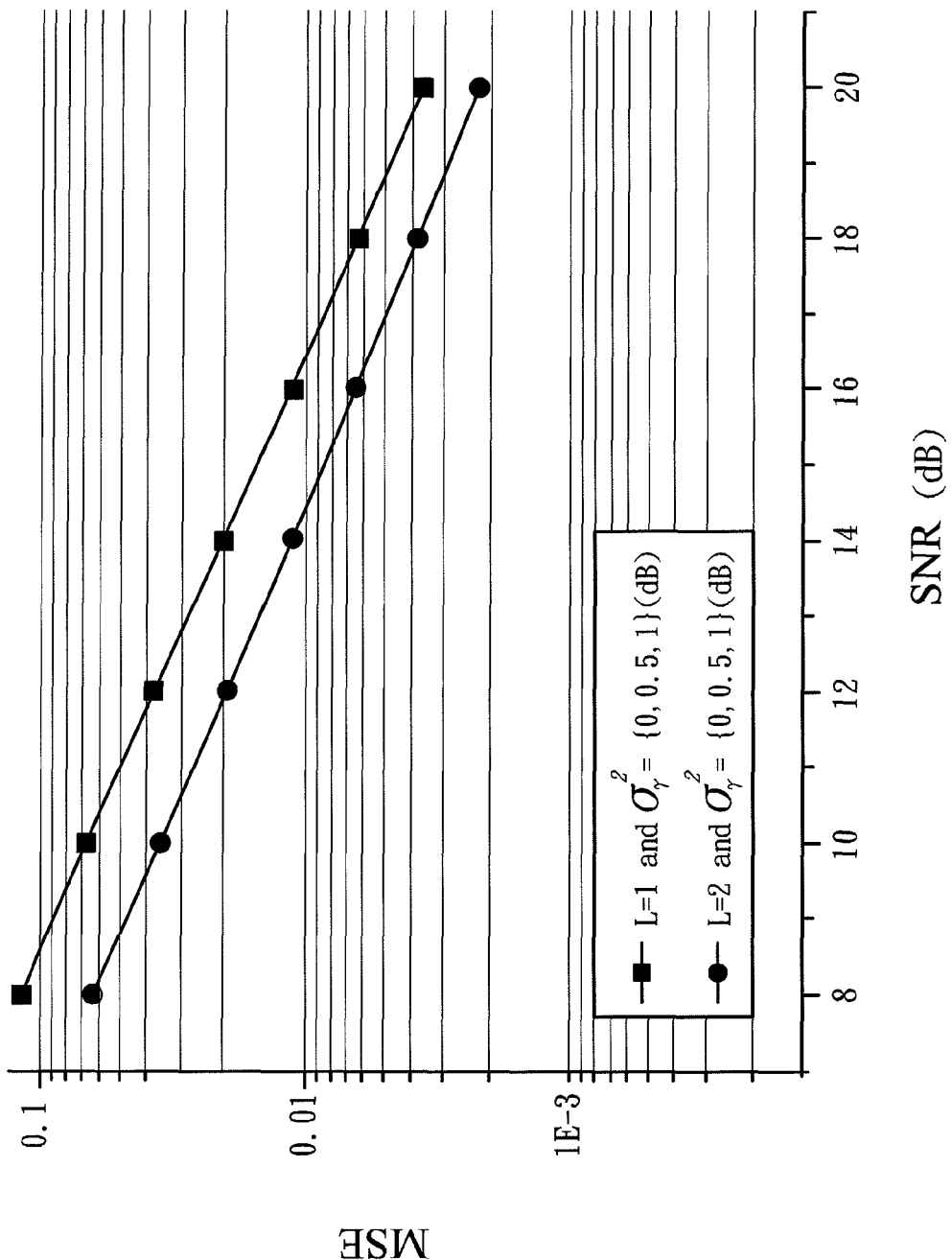
FIG. 5 is a diagram showing the MSE of a composite channel coefficient according to one embodiment of the present invention.
Figure 6:
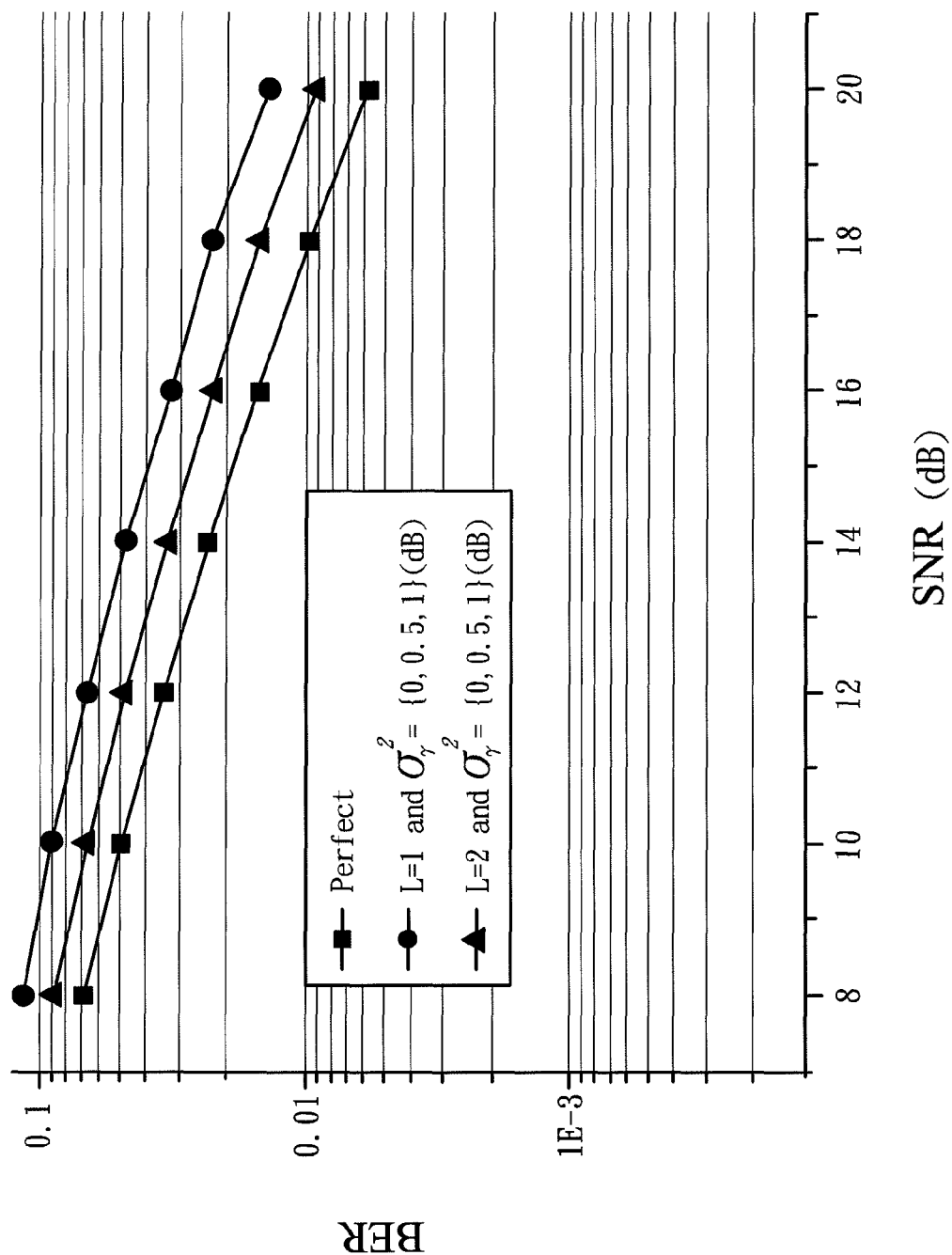
FIG. 6 is a diagram showing the BER of a relaying system operated under an MH protocol according to one embodiment of the present invention.

Below, observe the relaying system operated under the MH (Multi-Hop) protocol to understand the benefit of diversity to the performance of the system. Refer to FIG. 5 and FIG. 6. FIG. 5 is a diagram showing the mean square errors (MSE) of the composite channel coefficient according to one embodiment of the present invention. FIG. 6 is a diagram showing the bit error rate (BER) of a relaying system operated under the MH protocol according to one embodiment of the present invention. The estimation of the first channel coefficient may use the estimation results of the second channel coefficient. Take a complex Gaussian random variable with zero-mean to express the estimation error of the second channel, and let the variance thereof be $\sigma_r^2$. As shown in FIG. 5, when MSE is $5\times10^{-3}$, SNR (Signal to Noise Ratio) for L being 2 (the number of the preamble signal 61) is 2 dB greater than SNR for L being 1. Therefore, the more the number of the preamble signals 61, the more accurate the channel estimation, thereby is greatly reduced the MSE. It is observed in FIG. 5 that the variation of the estimation errors (expressed by the variance $\sigma_r^2$ does not affect the above-mentioned result under the MH protocol, so that the two curves are parallel to each other. For the MH protocol, only the estimate of the composite channel is required. Since the error of the second channel is compensated by the estimate of the first channel, the estimate of the composite channel obtained by combining the two estimates of first and second channels has nothing to do with the estimation error $\sigma_r^2$ due to the second channel. The BER of a relaying system operated under the MH protocol is shown in FIG. 6. A perfect channel estimation is used as the benchmark. The BER for L being 2 (the number of the preamble signal 61) is closer to BER under perfect channel estimation than BER for L being 1. Similarly, BER does not change with the variance $\sigma_r^2$.

Figure 7:
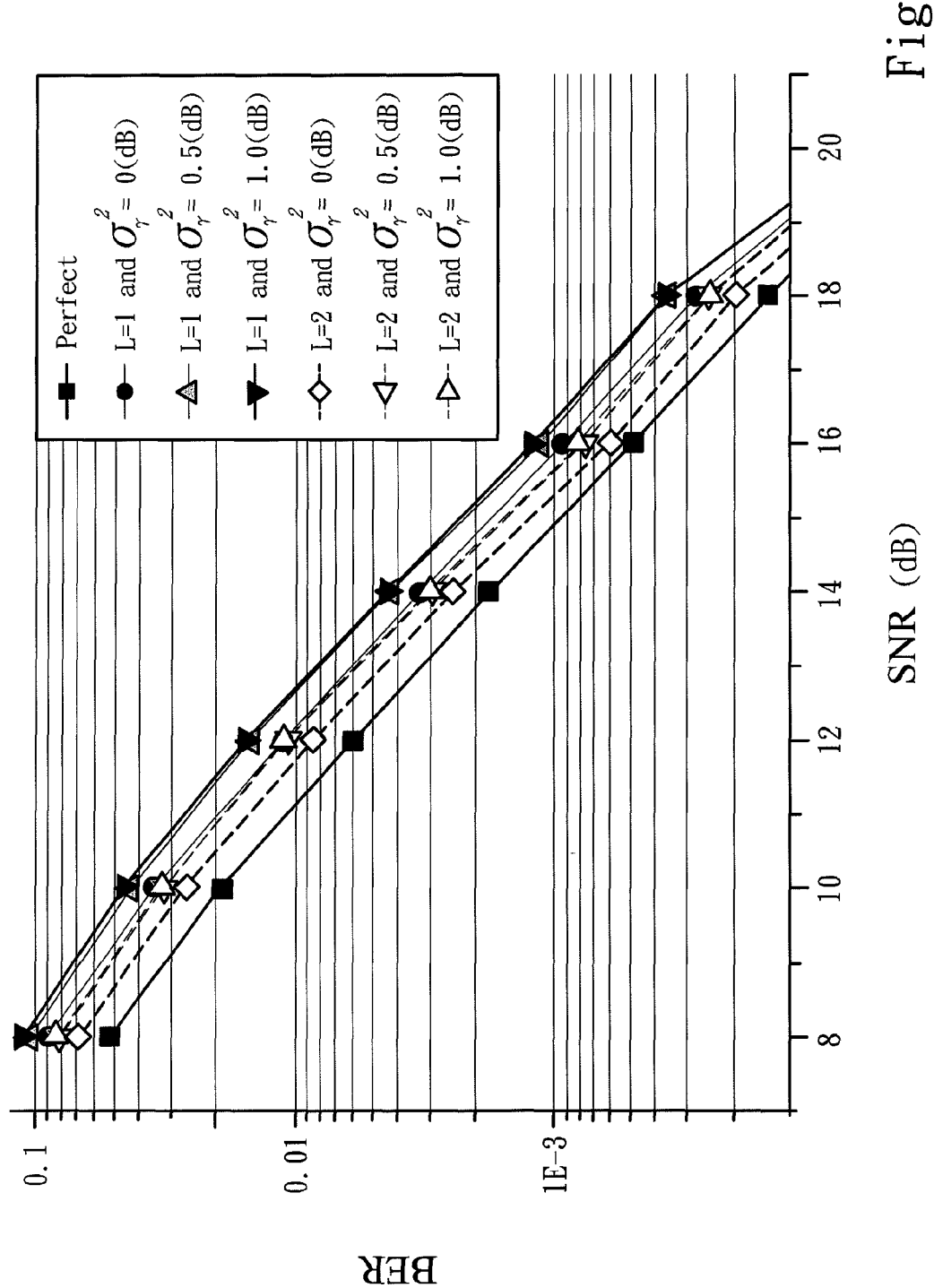
FIG. 7 is a diagram showing the BER of a relaying system after being optimum combining under an RD protocol according to one embodiment of the present invention.

Refer to FIG. 7 a diagram showing the BER of the relaying system after being optimum combining according to one embodiment of the present invention. The BER curves are obtained after MRC (Maximum Ratio Combining) has been performed under the RD (Received Diversity) protocol. As optimum combining is used to obtain diversity gain, it is not the estimation results of the overall composite channel but the individual estimation results of the first and second channels are needed to use in the case. In such a case, the individual first channel estimation result cannot offset the second channel estimation error. The greater the variance $\sigma_r^2$, the more likely the second channel estimation error influences BER. However, the influence is slight. For example, in the cases of $\sigma_r^2$ being 0.5 dB and $\sigma_r^2$ being 1 dB, both the SNR losses thereof are smaller than 0.3 dB in comparison with the perfect channel estimation. Furthermore, in comparison with FIG. 6 whose relaying system has no diversity gain, FIG. 7 shows that diversity gain obviously improves the performance.

In conclusion, the present invention uses the relay-amble signal 62 added in the frame 60 and obtained at the destination node 13 to estimate the second channel (the relay node 12 to the destination node 13) coefficient and then uses the second channel coefficient and an optimum ML algorithm to estimate the first channel (the source node 11 to the relay node 12) coefficient of the composite channel (the source node 11 to the relay node 12 to the destination node 13). Thereby, the optimum combining signal is obtained under the RD protocol through the optimum combining method. The method of the present invention is exempted from using MIP (Multipath Intensity Profile) but uses an optimum algorithm to perform channel estimation.

Therefore, the present invention is proved to meet the conditions of a patent. Thus, the Inventor files the application for a patent. It is appreciated if the patent is approved fast.

The embodiments described above are only to exemplify the present invention but not to limit the scope of the present invention. Any equivalent modification or variation according to the technical contents or spirit of the present invention is to be also included within the scope of the present invention.

What is claimed is:

1. An OFDM (Orthogonal Frequency Division Multiplexing)-based relay-assisted channel estimation method, which applies to an AF (Amplify-and-Forward) relaying system and separately estimates a channel from a source node to a relay node and a channel from the relay node to a destination node at the destination node in a wireless communication system in a relay-assisted way, comprising steps of:

constructing a system model, wherein a first channel and a second channel are constructed, and wherein the first channel represents the channel from the source node to the relay node and the second channel represents the channel from the relay node to the destination node, and wherein the destination node receives a signal including a kth sub-carrier wave through the first and second channels, and the signal is given by $$Y_k^d = (1/\sqrt{N})\sum_{n=0}^{N-1} y_n^d e^{-j2\pi kn/N}$$

-continued
$$= H_k^d H_k^r \alpha d_k + H_k^d \alpha W_k^r + W_k^d, \ 0 \le k \le N-1,$$

adding a relay-amble signal at the relay node, wherein the relay-amble signal is added to a frame carrying amplified and forwarded signals by the relay node, and transmitted to the destination node through the second channel;

estimating a second channel coefficient, wherein after the destination node has received the frame including the relay-amble signal, a second channel estimation is performed to obtain the second channel coefficient through the relay-amble signal;

estimating a first channel coefficient, wherein first channel estimation is performed to obtain the first channel coefficient through a ML (Maximum Likelihood) method and the estimate of second channel coefficient; and performing optimum combining, wherein after the first and second channel coefficients have been obtained, a direct path and a relay path are combined to obtain an optimum transmission signal under an RD (Received Diversity) protocol.

2. The OFDM-based relay-assisted channel estimation method according to claim 1 further comprising a step of adding a preamble signal to the frame after the step of constructing the system model, wherein the preamble signal is added to the frame carrying signals from the source node through a preamble signal unit.

3. The OFDM-based relay-assisted channel estimation method according to claim 2 further comprising a step of performing vector-matrixing after the step of adding the relay-amble signal, wherein the signal including the preamble signal is performed vector-matrixing through a vector-matrix unit.

4. The OFDM-based relay-assisted channel estimation method according to claim 3 further comprising a step of simplifying the first channel estimation after the step of estimating the first channel coefficient, wherein the first channel coefficient obtained after the ML method is simplified to simplify the first channel estimation through a simplification unit.

5. The OFDM-based relay-assisted channel estimation method according to claim 4 further comprising a step of diminishing noise after the step of simplifying the first channel estimation, wherein the first channel estimation obtained at the destination node is performed summation and average through an averaging unit to diminish the noise influence on the first channel estimation.

\* \* \* \* \*